E. HOPKINSON.
APPARATUS FOR USE IN VULCANIZING PNEUMATIC TIRE CASINGS FOR VEHICLES.
APPLICATION FILED FEB. 26, 1918.
1,289,773.
Patented Dec. 31, 1918.
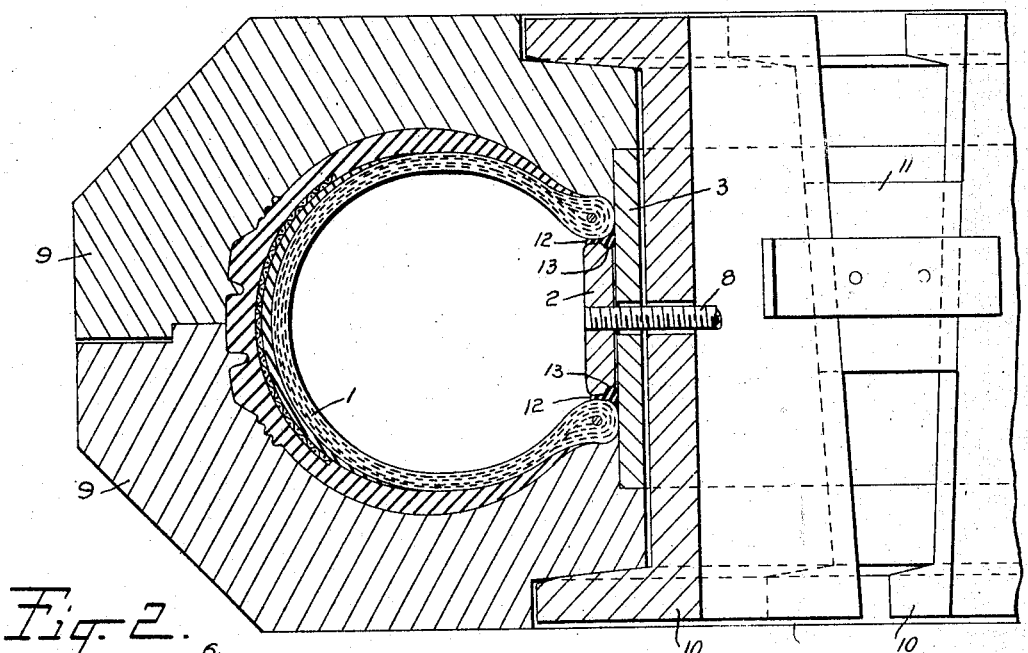
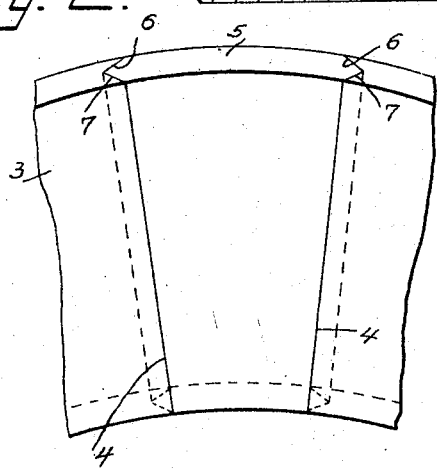
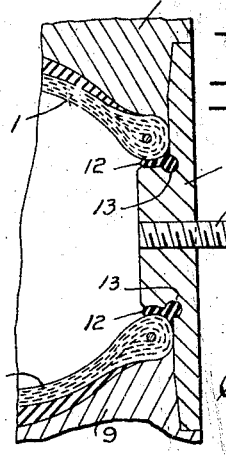
Inventor
Ernest Hopkinson

UNITED STATES PATENT OFFICE.

ERNEST HOPKINSON, OF NEW YORK, N. Y.

APPARATUS FOR USE IN VULCANIZING PNEUMATIC-TIRE CASINGS FOR VEHICLES.

1,289,773.  Specification of Letters Patent.  Patented Dec. 31, 1918.

Application filed February 26, 1918. Serial No. 219,234.

*To all whom it may concern:*

Be it known that I, ERNEST HOPKINSON, a citizen of the United States, residing in New York city, county and State of New York, have invented certain new and useful Improvements in Apparatus for Use in Vulcanizing Pneumatic-Tire Casings for Vehicles, of which the following is a full, clear, and exact description.

This invention relates more particularly to apparatus for use in vulcanizing pneumatic tire casings wherein is employed a fluid applied directly to the interior of the casing for giving it complete tire formation and for supporting it interiorly during vulcanization.

Referring to the drawings forming part of this specification:—

Figure 1 is a transverse sectional view of a preferred embodiment of my invention, Fig. 2 is a fragmental perspective of the tire supporting rim forming part of my invention, and Fig. 3 is a fragmental transverse sectional view of a modified form of the invention.

In this method wherein fluid pressure is applied directly to the interior of the casing, it is necessary to provide means for coöperating with the casing to form a closure suitable for the maintenance of the desired fluid pressure for bringing the tire to complete formation and for maintaining it under the required pressure during vulcanization and it is the object of my invention to provide suitable means for attaining these results.

Pneumatic tire casings are ordinarily composed of fibrous material associated with rubber and it is the usual practice to protect the fibrous component by having the entire exposed surface of the casing both internally and externally formed of rubber. This prevents moisture and other injurious agents from entering the fiber and also prevents the wear by friction which the fiber might be subjected to if it were exposed on the surface of the casing. The coating of rubber on the interior wall of the casing is usually comparatively thin, being ordinarily about .005 of an inch in thickness. In order to produce a satisfactory casing, it is important that this thin layer of rubber, covering the interior of the casing, should remain in perfect condition in the final product, that is to say it should present no blemishes throughout its entire area. Moreover in this method of vulcanization wherein fluid is directly applied to the interior of the casing, it is of special importance that this thin unvulcanized layer of rubber should not be disturbed, for abrasions of the surface will expose the fiber beneath, and I have found that when this occurs the fluid applied to the interior of the casing enters the exposed fiber and works its way into the body of the rubber and fiber wall composing the casing and often in this way reaches the most remote parts. When the fluid is permitted to enter the body of the casing in this manner, it results in separating the plies composing the casing producing blisters throughout the structure and in general producing havoc that renders the finally vulcanized casing absolutely useless.

The principal object of my invention is therefore to devise means for closing the interior of the casing from the exterior to form a chamber for the fluid without disturbing the thin film of unvulcanized rubber that covers the interior wall of the casing.

The edge portions of the casing are usually formed by folding the plies of fibrous material and rubber about wire rings, hard rubber cores, and the like, and whether this or some other method be pursued, these portions usually, on account of their bulkiness, rigidity, reduction in diameter, etc., as compared to other portions of the casing, present more or less surface irregularities. As it is at these portions that the closing means is preferably applied, another important feature of my invention is to provide a closing means that will not only operate without injury to the thin layer of rubber as before mentioned, but will also be capable of lending itself to the surface irregularities of the engaging surface, and thereby form an adequate seal to prevent harmful escape of the fluid from the chamber formed within the casing.

In the preferred embodiment of my invention, the closing means which coöperates with the casing to form a fluid chamber is provided with a cushioning face that will prevent abrasion of the rubber surface of the casing and the resulting exposure of the fiber applied beneath. While the sealing means may be applied to any desired part of the joint between the closing means and casing, I prefer to provide a single means that will serve both as a cushioning face for the closure and the sealing means for preventing the escape of the fluid.

Fig. 1 illustrates one embodiment of my invention and Fig. 3 a modification thereof. The closure for the casing 1 of Fig. 1 comprises a portion 2 which extends into the casing to span the gap between the edge portions thereof and which coöperates therewith to form a fluid chamber, and a portion 3 extending laterally on either side for engaging the casing exteriorly on its inner circumference. The portion 2 is preferably in the form of a closed ring and the portion 3 is in the form of a rim disposed in and detachable from the ring 2. The rim is preferably broken by a wedge-shaped opening 4 which is adapted for the reception of a correspondingly wedge-shaped key 5, the coacting faces being provided respectively with the V-shaped grooves 6 and tongues 7 for securing the key and rim together. The key operates in an obvious manner to expand the rim for compressing the edges of the casing to give them the desired diameter of the finished tire. A tube 8 is secured in the ring 2 which may be connected with any suitable source for supplying the fluid to the chamber within the casing.

It is usually desirable to confine the exterior of the casing during the vulcanizing treatment, and when such a step is resorted to, the usual cloth wrappings or any other means may be employed as desired. On account of the characteristics before mentioned. it is usually desirable however to provide rigid walls within which to confine the edge portions of the casing during vulcanization so that as they expand under the heat of vulcanization the pressure thus created will result in compacting the many plies composing the edge portions and in removing or minimizing the surface irregularities. In my preferred embodiment, I therefore provide exterior rigid walls which in the present instance are represented by the mold sections 9—9 which may be of any usual or preferred construction. The sections are channeled to engage the rim 3 as shown, and coöperate therewith to form a complete closure for the casing. As a ready means of holding the sections together, I have shown a clamping ring 10 formed of contacting sections and provided with a wedge-shaped opening for receiving the wedge-shaped key 11 for better securing the sections in place. This feature forms no part of the present invention and therefore requires no further description.

As before mentioned, the ring 2 preferably extends into the casing as it thus serves to limit the inward movement of the edges of the tire and affords a ready means for coöperating with the external confining means for compacting the said edge portions and smoothing out the irregularities thereof. The facing and sealing means before referred to is therefore preferably applied to the casing-engaging-faces of the ring 2 and is conveniently in the form of bands 12. It will be readily understood that to provide a suitable closure, which will form a fluid-tight joint without disturbing the rubber covering of the casing, an important and difficult problem is presented, especially when, from a practical standpoint, it is also necessary to provide an apparatus simple and comparatively inexpensive in construction, and comparatively inexpensive cushioning and sealing means easily applied and positive in operation to insure perfect tires being produced.

I have found that a plastic, such as unvulcanized rubber, meets all the above mentioned requirements and produces entirely satisfactory results. The plastic is preferably reduced to strip form in any preferred or well-known manner and applied to the faces of the ring. These faces are preferably provided with channels 13 for receiving the plastic strips which facilitates holding them in place until the assemblage of the casing and other parts is effected. The surface of the rubber strips may be covered with any of the well-known substances such as talc, starch, and the like for preventing their vulcanization to the contacting rubber surface of the casing. To obtain the best results a fresh rubber strip should be used with each tire, but this does not represent a total loss of the used strips as they may be mixed in rubber compounds for other uses. I prefer however, to use the cheapest grade of rubber compound or other suitable plastic that will serve the intended purpose in order to reduce the cost to a minimum. Moreover the cheaper grade of plastic will have less power to vulcanize with the contacting rubber surface of the casing and is therefore desirable for this reason also.

I have found that even though the plastic does not produce a perfect seal when the parts are first assembled and the fluid pressure is applied that this is soon corrected when the heat of vulcanization is applied. Under this heat, the plastic becomes semi-fluid and more readily conforms to the irregularities of the adjacent surfaces. Moreover the edge portions of the casing, losing much of their rigidity under this heat and being under the influence of the rigid surrounding walls, lose much of their original irregularity thereby aiding in the forming of a more perfect joint, which is further increased by the expansion of both the edge portions and the plastic seal due to the rise in temperature.

I have found that satisfactory results are obtained by forming the channels or recesses as represented at 13 as they provide for an increase in the thickness of the plastic at these parts so that, as the plastic expands it will be forced into the narrow space between the ring and edge portions of the casing adjacent the fluid chamber to form a tight seal along these portions, the fluid pressure in the chamber acting to some extent as a back pressure upon the plastic to perfect the seal. There is little danger of any extensive amount of plastic being forced between the rim 3 and the edges of the casing, for as before remarked, the rim 3 is previously expanded to firmly press against the edge portions, which pressure is later increased by the expansion of the casing under the heat of vulcanization.

It will be noted that the ring 2 and rim 3 are independent of each other and I prefer to combine the two with a loose working fit even when the rim has been expanded so that the ring will serve as a floating member to insure centralization thereof and equalization of pressure upon the edges of the casing.

Fig. 3 illustrates a closure 14 wherein the ring and rim are formed integrally and while I prefer the embodiment shown in Fig. 1 for the reasons already stated and because the parts are more easily assembled with the casing, nevertheless the modified structure of Fig. 3 may be used if desired.

As other embodiments of this invention may be made without departing from the spirit thereof, it is to be understood that I do not intend to limit myself to the specific form of embodiment of the invention herein described.

Having thus described my invention, what I claim and desire to protect by Letters Patent is:—

1. Apparatus for use in vulcanizing tire casings having an exposed rubber surface forming a part thereof covering plies of fibrous material and rubber, which comprises a closure adapted to coöperate with the exposed rubber surface forming the interior of the casing to form walls defining a fluid-tight chamber, said closure having cushioning faces for directly engaging the casing for sealing the joint therebetween and for protecting the exposed rubber surface adjacent thereto to prevent abrasion thereof by the closure and the resulting exposure of the fiber ply beneath, and means for introducing fluid into the chamber.

2. Apparatus for use in vulcanizing tire casings having an exposed rubber surface forming a part thereof covering plies of fibrous material and rubber, which comprises means for supporting the exterior edge portions of the casing, a closure adapted to coöperate with the exposed rubber surface forming the interior of the casing to form walls defining a fluid-tight chamber, means for introducing fluid into the chamber, and a cushioning facing for the casing-engaging-surface of the closure for sealing the joint therebetween and for protecting the exposed rubber surface adjacent thereto to prevent abrasion thereof by the closure and the resulting exposure of the fiber ply beneath.

3. Apparatus for use in vulcanizing tire casings having an exposed rubber surface forming a part thereof covering plies of fibrous material and rubber, which comprises a ring adapted to coöperate with the exposed rubber surface forming the interior of the casing to form walls defining a fluid-tight chamber, said ring having cushioning faces for directly engaging the casing for sealing the joint therebetween and for protecting the exposed rubber surface adjacent thereto to prevent abrasion thereof by the ring and the resulting exposure of the fiber-ply beneath, and means for introducing fluid into the casing.

4. Apparatus for use in vulcanizing tire casings having an exposed rubber surface forming a part thereof covering plies of fibrous material and rubber, which comprises means for supporting the exterior edge portions of the casing, a ring adapted to coöperate with the exposed rubber surface forming the interior of the casing to form walls defining a fluid-tight chamber, said ring having cushioning faces for directly engaging the casing for sealing the joint therebetween and for protecting the exposed rubber surface adjacent thereto to prevent abrasion thereof by the ring and the resulting exposure of the fiber ply beneath, and means for introducing fluid into the chamber.

5. Apparatus for use in vulcanizing tire casings comprising a support for engaging the edges of the casing, a sealing member of yielding material for rendering the interior of the casing fluid-tight, means for expanding the support outward radially for compressing the said edges for defining the diameters thereof, and means for introducing fluid into the casing.

6. Apparatus for use in vulcanizing tire casings comprising a support therefor having a portion adapted to extend into the interior of the casing and provided with cushioning faces for engaging the casing for sealing the joint therebetween to coöperate therewith to form a fluid chamber and laterally extending portions adapted to engage the casing exteriorly at the edge portions thereof, an exterior mold engaging the laterally extending portions of the support for forming a complete inclosure for the casing, and means for introducing fluid into the chamber.

7. Apparatus for use in vulcanizing tire casings comprising a ring adapted to engage the interior of the casing and provided with cushioning faces for engaging the casing for sealing the joint therebetween to coöperate therewith to form a fluid chamber, a rim within the ring detachable therefrom for supporting the edges of the casing, and means for introducing fluid into the interior of the chamber.

8. Apparatus for use in vulcanizing tire casings comprising a ring adapted to engage the interior of the casing and to coöperate therewith to form a fluid chamber, a rim within the ring detachable therefrom for supporting the edges of the casing, means for expanding the rim for compressing the said edges, and means for introducing fluid into the interior of the chamber.

9. Apparatus for use in vulcanizing tire casings comprising a closure for engaging the edge portions of the casing to form therewith walls defining a chamber, a facing for the casing-engaging-surface of the closure formed of plastic material, and means for introducing fluid into the interior of the chamber.

10. Apparatus for use in vulcanizing tire casings comprising a closure for engaging the edge portions of the casing to form therewith walls defining a chamber, a facing for the casing-engaging-surface of the closure formed of a material expansible under the heat of vulcanization for better conforming it to the irregularities of the adjacent surfaces to form a fluid-tight seal, and means for introducing fluid into the chamber.

11. Apparatus for use in vulcanizing tire casings comprising a closure for engaging the edge portions of the casing to form therewith walls defining a chamber, a facing for the casing-engaging-surface of the closure formed of a material semi-fluid under the heat of vulcanization for better conforming it to the irregularities of the adjacent surfaces to form a fluid-tight seal, and means for introducing fluid into the chamber.

12. Apparatus for use in vulcanizing tire casings comprising a closure for engaging the edge portions of the casing to form therewith walls defining a chamber, a facing of unvulcanized rubber for the casing-engaging-surface of the closure, and means for introducing fluid into the chamber.

13. Apparatus for use in vulcanizing tire casings comprising a closure for engaging the edge portions of the casing to form therewith walls defining a chamber having its engaging surfaces channeled, a facing of plastic material disposed in the channels, and means for introducing fluid into the chamber.

14. Apparatus for use in vulcanizing tire casings comprising a support therefor having a portion adapted to extend into the interior of the casing and spaced therefrom and laterally extending portions adapted to directly engage the casing exteriorly at the edge portions thereof, a facing of plastic material filling the spaces to form with the said support and casing a chamber, and means for introducing fluid into the chamber.

15. Apparatus for use in vulcanizing tire casings comprising means provided with channels formed in oppositely disposed side walls thereof for closing the gap between the edge portions of the casing for coöperating with the casing to form walls defining a chamber, means for introducing fluid into the chamber, and sealing rings of rubber engaged by said channels for directly engaging the casing to prevent the escape of fluid from the chamber.

16. Apparatus for use in vulcanizing tire casings comprising exterior supports for the edge portions of the casing, a floating ring provided with cushioning faces for engaging the edge portions interiorly for coöperating with the interior of the casing for forming a fluid chamber, and means for introducing fluid into the chamber.

Signed at New York city, New York, this 21st day of February, 1918.

ERNEST HOPKINSON.